US012185876B2

(12) United States Patent
Siu et al.

(10) Patent No.: US 12,185,876 B2
(45) Date of Patent: Jan. 7, 2025

(54) KITCHEN DEVICE

(71) Applicant: BREVILLE PTY LIMITED, Alexandria (AU)

(72) Inventors: Eddie Siu, Alexandria (AU); Khon Minh Thai, Alexandria (AU); Bin Geng, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 744 days.

(21) Appl. No.: 17/416,505

(22) PCT Filed: Dec. 17, 2019

(86) PCT No.: PCT/AU2019/051388
§ 371 (c)(1),
(2) Date: Jun. 20, 2021

(87) PCT Pub. No.: WO2020/124138
PCT Pub. Date: Jun. 25, 2020

(65) Prior Publication Data
US 2022/0071451 A1  Mar. 10, 2022

(30) Foreign Application Priority Data
Dec. 21, 2018  (AU) ............... 2018904904

(51) Int. Cl.
A47J 43/07   (2006.01)
A47J 43/046  (2006.01)
(Continued)

(52) U.S. Cl.
CPC ......... A47J 43/0766 (2013.01); A47J 43/046 (2013.01); A47J 43/0722 (2013.01);
(Continued)

(58) Field of Classification Search
CPC .... A47J 43/085; A47J 43/046; A47J 43/0727; A47J 44/00; A47J 43/0766; A47J 43/0722; A47J 43/0772
See application file for complete search history.

(56) References Cited

U.S. PATENT DOCUMENTS 6,629,492 B1  10/2003  Li
9,198,540 B2  12/2015  Carlson
(Continued)

FOREIGN PATENT DOCUMENTS

CN   2838499 Y   11/2006
EP   0942674 B1   9/1999
(Continued)

OTHER PUBLICATIONS

International Search Report dated Jan. 15, 2020 for International Application No. PCT/AU2019/051388.
(Continued)

Primary Examiner — Thien S Tran
(74) Attorney, Agent, or Firm — Tarolli, Sundheim, Covell & Tummino LLP

(57) ABSTRACT

A kitchen device (10), the kitchen device (10) including: a base (12) having a motor (58); a vessel assembly (14) removably mounted on the base (12), the vessel assembly (14) having: a vessel (16) providing a space (36) to receive ingredients to be processed; a blade assembly (38) at least partly located in the space (36) and drivable by the motor (58) to process the ingredients, the blade assembly (38) also projecting outwardly from the vessel (16) to provide for driving engagement by the motor (58); and a collar (40) to engage the blade assembly (38) and secure the blade assembly (38) to the vessel (16), the collar (40) being movable relative to the vessel (16) between a release position allowing removal of the blade assembly (38) from the vessel (16) and a securing position fixing the blade assembly (38) to the (Continued)

vessel (16); the kitchen device (10) further including a sensor mechanism (39) to detect, when the vessel assembly (14) is mounted on the base (12), whether the collar (40) is in the securing position, wherein the motor (58) is only operable when the sensor mechanism (39) detects that the collar (40) is in the securing position.

8 Claims, 9 Drawing Sheets

(51) Int. Cl.
    *A47J 43/08*     (2006.01)
    *A47J 44/00*     (2006.01)

(52) U.S. Cl.
    CPC ....... *A47J 43/0727* (2013.01); *A47J 43/0772* (2013.01); *A47J 43/085* (2013.01); *A47J 44/00* (2013.01)

(56) References Cited

U.S. PATENT DOCUMENTS

| | | | | |
|---|---|---|---|---|
| 2011/0013478 | A1* | 1/2011 | Athey | A47J 43/0766 366/205 |
| 2011/0248108 | A1* | 10/2011 | Carriere | A47J 43/0772 241/37.5 |
| 2015/0037480 | A1 | 2/2015 | Carlson | |
| 2015/0098298 | A1 | 4/2015 | Sapire | |
| 2018/0160855 | A1 | 6/2018 | Krivos et al. | |
| 2018/0206677 | A1* | 7/2018 | Ivarsson | A47J 36/24 |
| 2019/0000273 | A1* | 1/2019 | Sapire | A47J 43/085 |
| 2019/0000275 | A1* | 1/2019 | Sapire | A47J 43/046 |

FOREIGN PATENT DOCUMENTS

| | | |
|---|---|---|
| EP | 2275013 A1 | 1/2011 |
| EP | 2471424 A1 | 7/2012 |
| EP | 2875762 | 5/2015 |
| EP | 3287057 A1 | 2/2018 |
| EP | 3292806 A1 | 3/2018 |
| EP | 3298935 A1 | 3/2018 |
| EP | 3644813 B1 | 5/2020 |
| WO | WO-2007110493 A2 | 10/2007 |
| WO | 2017031525 A1 | 3/2017 |
| WO | WO-2018210943 A1 | 11/2018 |
| WO | WO-2019005231 A1 | 1/2019 |

OTHER PUBLICATIONS

Extended European Search Report (EESR) issued Aug. 9, 2022 for corresponding EP.
EP Office Action for corresponding EP Application No. 19 898 644.0, dated Mar. 5, 2024, 4 pgs.
1 Chinese Office Action for CN Application No. 201980084115.4, dated May 22, 2024, 9 pages.

* cited by examiner

KITCHEN DEVICE

FIELD

This invention relates to a kitchen device.

BACKGROUND

Kitchen devices, for example food processors, often have a blade assembly for processing ingredients that moves at high rotational velocities. To facilitate cleaning of the blade assembly and manufacture of the individual components, kitchen devices are often designed to have a vessel assembly with a removable vessel, and with the blade assembly being secured in the removable vessel using a securing mechanism.

If the securing mechanism is not appropriately secured, a risk to the user may emanate from the blade assembly become loose and disengaged from the vessel. Present devices are not able to determine whether the blade assembly and securing mechanism are fully secured to the vessel.

SUMMARY OF INVENTION

It is an object of the present invention to at least substantially address the above disadvantage, or at least provide a useful alternative to the above discussed kitchen devices.

In a first aspect the present invention provides a kitchen device, the kitchen device including:
 a base having a motor;
 a vessel assembly removably mounted on the base, the vessel assembly having:
  a vessel providing a space to receive ingredients to be processed;
  a blade assembly at least partly located in the space and drivable by the motor to process the ingredients, the blade assembly also projecting outwardly from the vessel to provide for driving engagement by the motor; and
  a collar to engage the blade assembly and secure the blade assembly to the vessel, the collar being movable relative to the vessel between a release position allowing removal of the blade assembly from the vessel and a securing position fixing the blade assembly to the vessel; the kitchen device further including a sensor mechanism to detect, when the vessel assembly is mounted on the base, whether the collar is in the securing position,
 wherein the motor is only operable when the sensor mechanism detects that the collar is in the securing position.

Preferably, the sensor mechanism includes:
 a first sensor portion located in the collar; and
 a second sensor portion located in the base,
wherein the first sensor portion and second sensor portion cooperate to detect whether the collar is in the securing position.

Preferably, the kitchen device further has a controller configured to receive a securing signal from sensor mechanism, and the motor is controlled by the controller using a motor controller,
wherein the controller prevents operation of the motor unless the securing signal is received.

Preferably, the collar has an aperture that cooperates with a protrusion located on the vessel to define a unique securing position.

Preferably, the protrusion on the vessel cooperates with a receptacle in the kitchen device to locate the vessel assembly in a predetermined position in the kitchen device.

Preferably, the blade assembly has a plurality of protrusions to engage a plurality of recesses in the vessel such that the blade assembly is prevented from rotating relative to the vessel.

Preferably, the kitchen device further includes a heating element adapted to heat the vessel for cooking the ingredients to be received in the vessel.

In a second aspect the present invention provides a method of operating a kitchen device, the kitchen device having:
 a base having a motor;
 a locking arm;
 a vessel assembly, the vessel assembling including:
  a vessel providing a space to receive ingredients to be processed;
  a lid removably located on the vessel to seal the space;
  a blade assembly at least partly located in the space and drivable by the motor to process the ingredients, the blade assembly also projecting outwardly from the vessel to engage the motor; and
  a collar movable between a release position allowing removal of the blade assembly from the vessel and a securing position fixing the blade assembly to the vessel;
 a sensor mechanism to detect, when the vessel assembly is mounted on the base, whether the collar is in the securing position
 a locking arm to lock the lid against the vessel, the locking arm having a lid sensor to determine whether the lid is located on the vessel; and
 a controller to:
  control the motor using a motor controller;
  receive a lid locking signal from the lid sensor indicating that the lid is located on the vessel; and
  receive a securing signal from the first sensor portion and/or the second sensor portion indicating that the collar is in the securing position, the method comprising the steps of:
 the controller determining whether it has received the lid locking signal;
 the controller determining whether it has received the securing signal;
 the controller outputting an error message if it has not received the lid locking signal or the securing signal.

BRIEF DESCRIPTION OF DRAWINGS

Preferred embodiments of the present invention will now be described, by way of examples only, with reference to the accompanying drawings.

DESCRIPTION OF EMBODIMENTS

Figure 1:
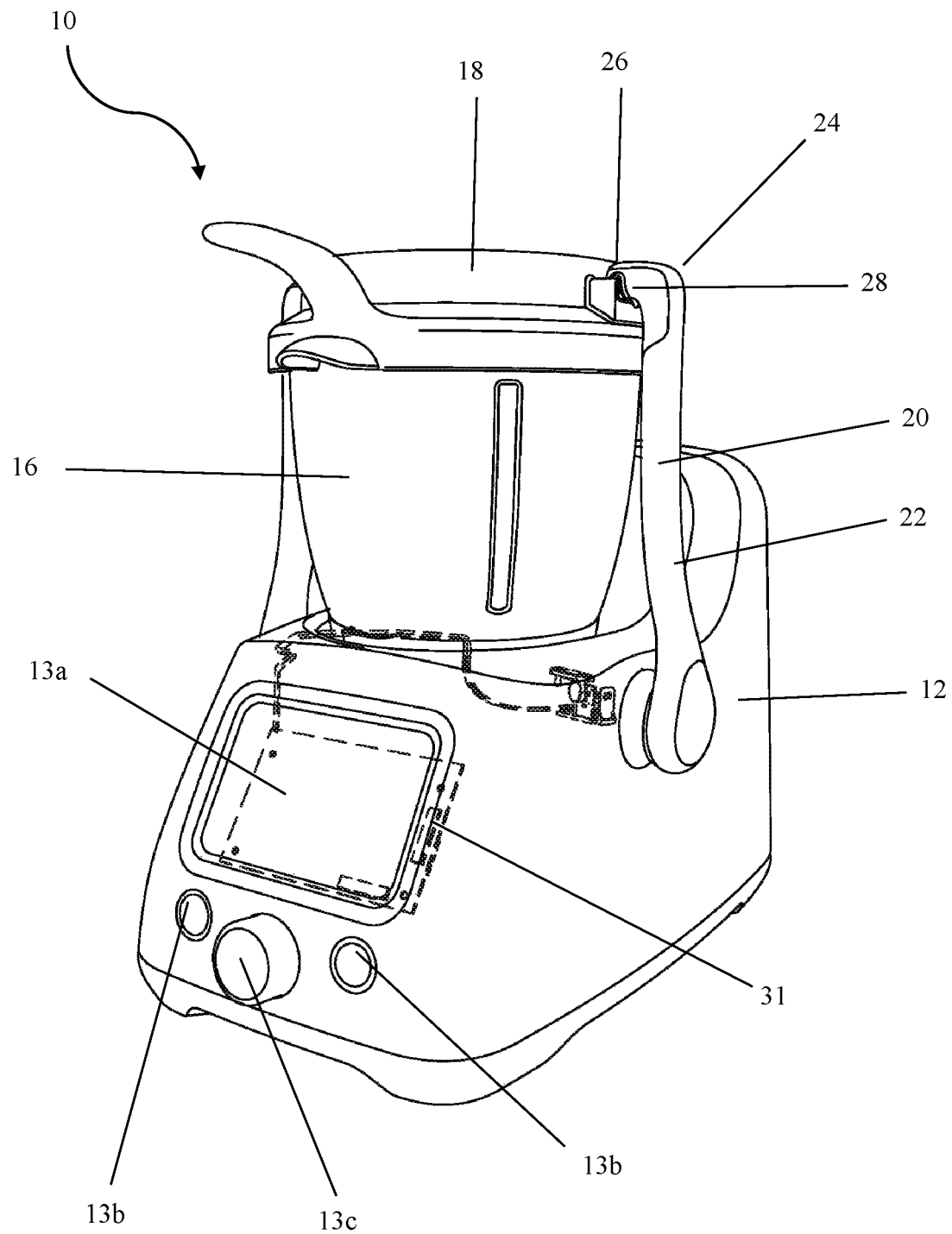
FIG. 1 is a perspective view of a kitchen device according to an embodiment of the invention.

As seen in FIG. 1, a kitchen device 10 according to an embodiment includes a base 12 and a removable vessel assembly 14 received in the base 12. Arranged on the base 12 are a number of control input devices 13, in this embodiment a touchscreen 13*a*, two buttons 13*b*, and a dial 13*c*. The vessel assembly 14 includes a vessel 16 and a lid 18 received on the vessel 16. The kitchen device 10 further includes a locking arm 20 to secure the lid 18 against the vessel 16, when the vessel 16 is received in the base 12.

Figure 2:
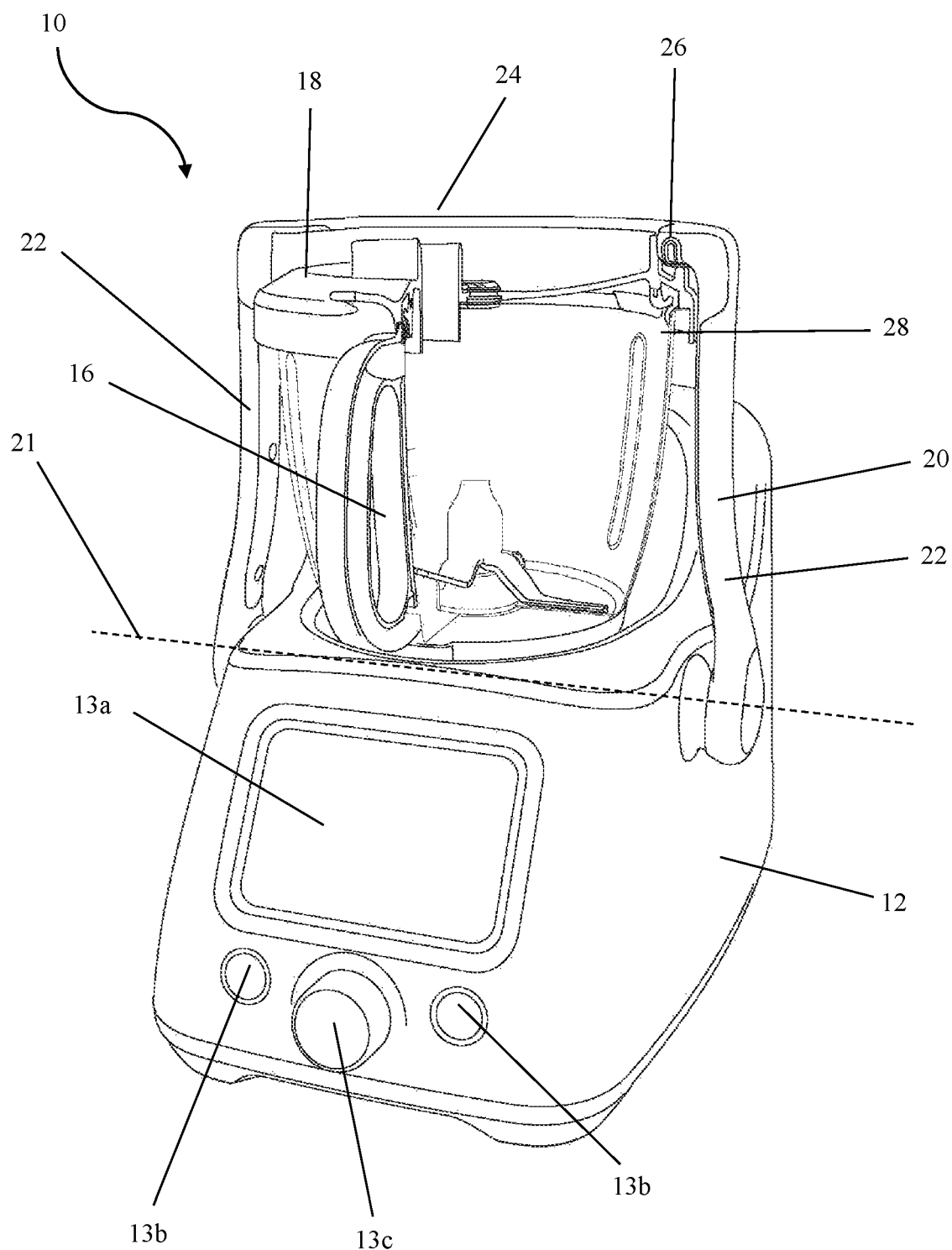
FIG. 2 is a perspective cut-away view of the kitchen device of FIG. 1.

As shown in FIG. 2, the locking arm 20 comprises two generally upright elongated members 22 joined by a rounded member 24, the rounded member 24 being configured to engage the lid 18. The locking arm 20 is pivotable about a locking arm axis 21 between a free position, where the vessel assembly 14 may be removed from the base 12, and a locking position shown in FIG. 2, where the rounded member 24 engages the lid 18. The rounded member 24 includes two channels 26 that each contain a lid sensor 28. The lid sensor 28 is configured to cooperate with a protrusion 30 on the lid 18 to generate a lid locking signal when the lid 18 is secured against the vessel 16 by the locking arm 20. The kitchen device 10 also has a controller 31 configured to receive the lid locking signal.

Figure 3:
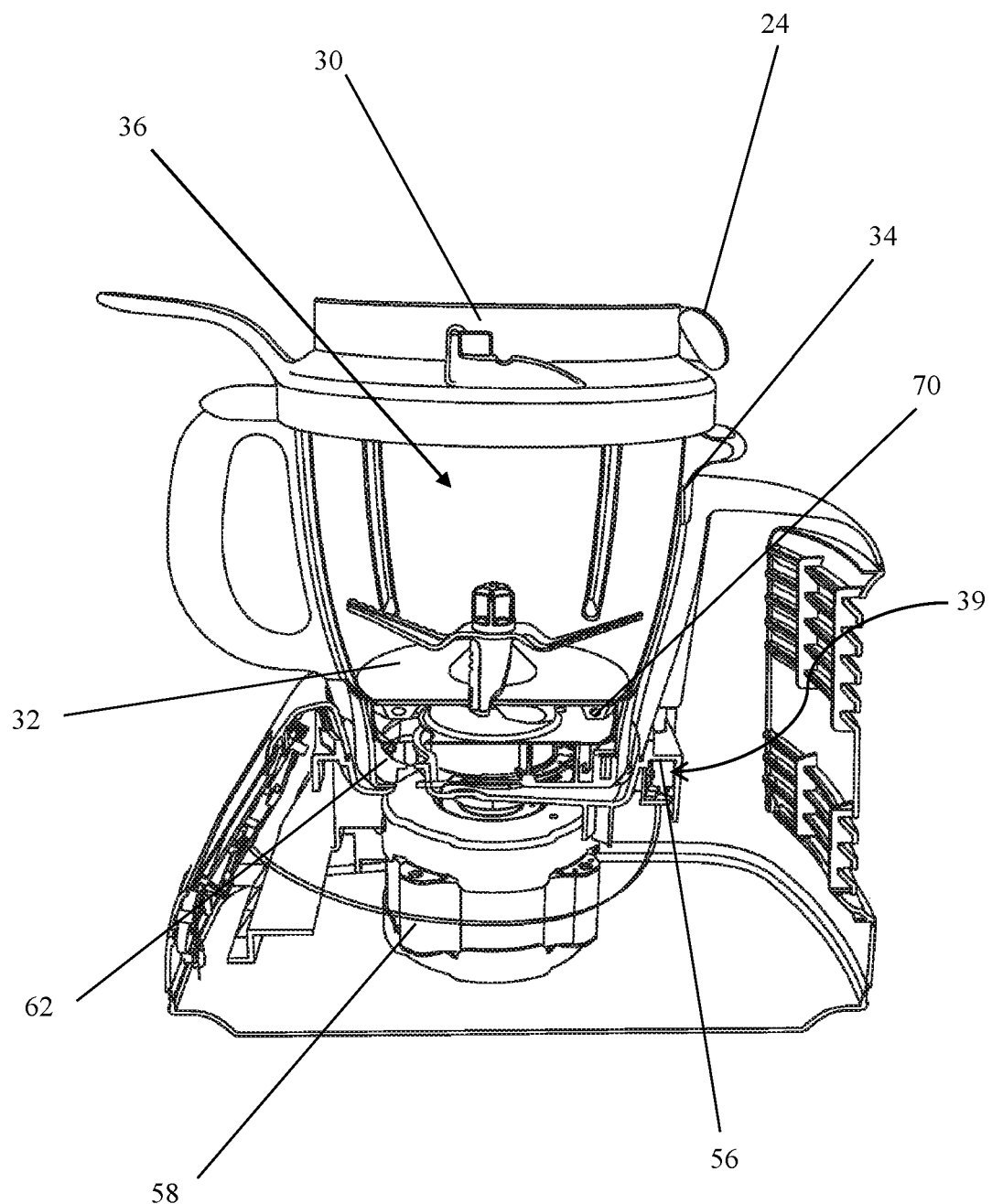
FIG. 3 is a perspective cut-away view of the kitchen device of FIG. 1.

As seen in FIG. 3, the vessel 16 has a bottom wall 32 and a sidewall 34 extending upwardly therefrom. The bottom wall 32 and sidewall 34 define a space 36 provided by the vessel 16 to receive ingredients to be processed. The sidewalls 34 extend upwardly to a rim 35 defining an opening 37 to the space 36. The lid 18, when received atop the vessel 16, seals the space 36. The vessel assembly 14 further includes a blade assembly 38 at least partly located in the space 36 to process the ingredients.

Figure 6:
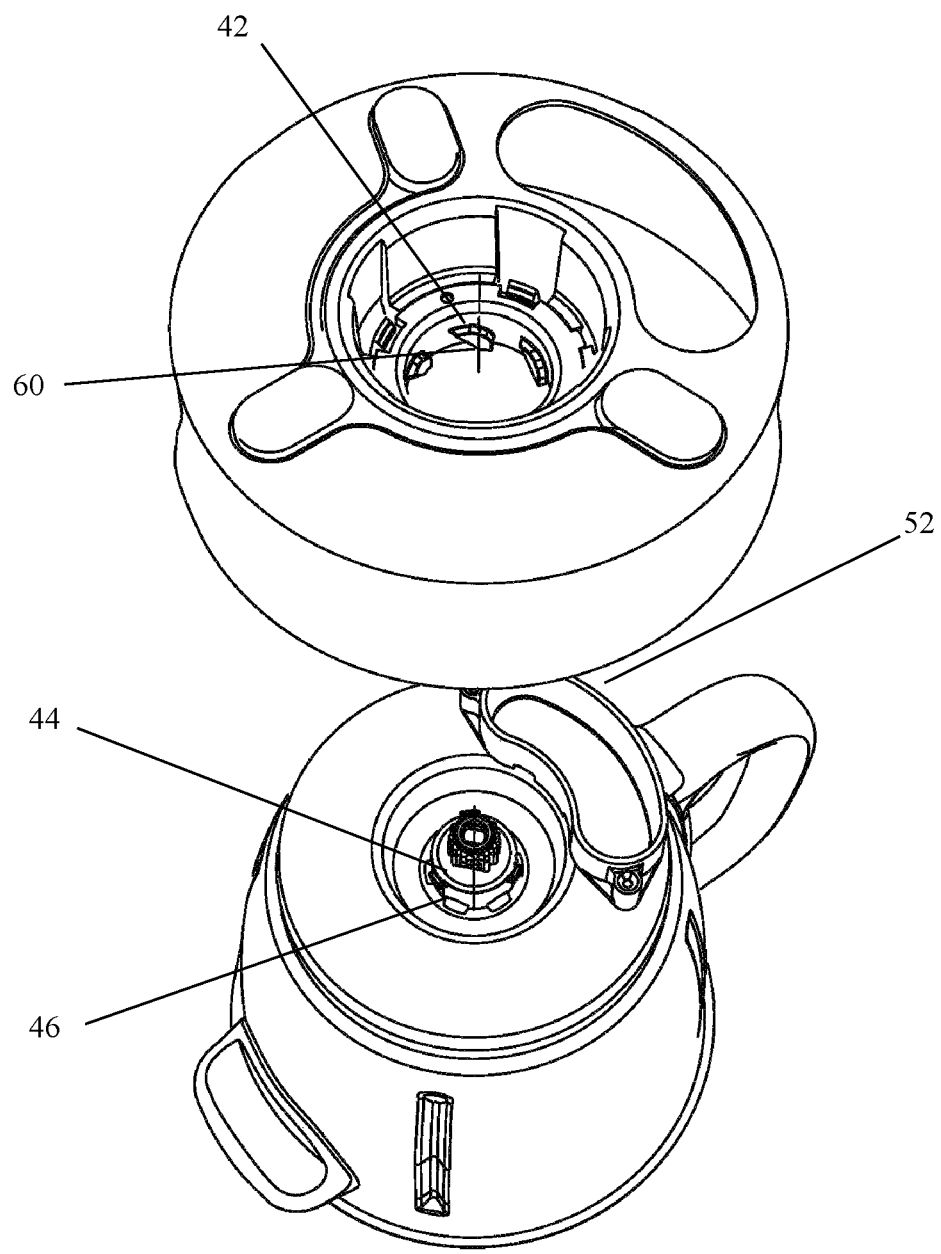
FIG. 6 is a partially exploded bottom perspective view of the vessel assembly of FIG. 4.

The vessel assembly 14 further includes a collar 40 engaged with the blade assembly 38 to secure the blade assembly 38 to the vessel 16. As best seen in FIG. 6, the collar 40 has a plurality of slanted tabs 42 that engage a plurality of tabs 44 located on the blade assembly 38 to urge the blade assembly 38 against the bottom wall 32 of the vessel 16 when the collar 40 is pivoted relative to the vessel 16. The blade assembly 38 further has a plurality of protrusions 46 that engage a complimentary plurality of recesses 48 surrounding an aperture 49 in the bottom wall 32 to prevent rotation of the blade assembly 38 relative to the vessel 16. The collar 40 also has an aperture 50 that cooperates with a protrusion 52 on the vessel 16.

Figure 4:
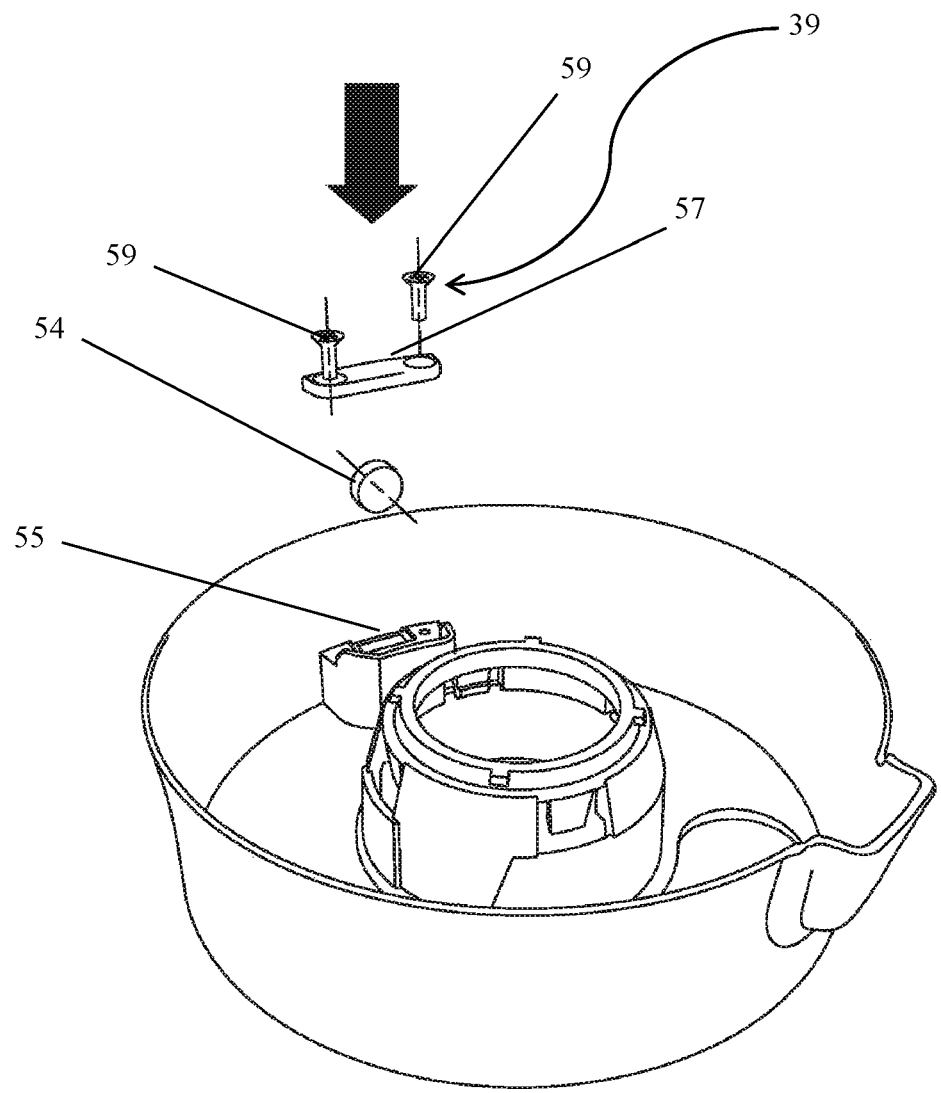
FIG. 4 is a detailed perspective view of a collar of the kitchen device of FIG. 1.

As best seen in FIG. 4, the kitchen device 10 also includes a sensor mechanism 39, the sensor mechanism 39 including a first sensor portion in the collar 40, which in this embodiment is a magnet 54. The magnet 54 is located towards the external perimeter of the collar 40 and retained in a recess 55. The magnet 54 is retained in the recess 55 by a tab 57 secured by two fasteners 59.

Returning to FIG. 3, the sensor mechanism 39 also includes a second sensor portion, which in this embodiment is a hall sensor 56, located in the base 12 to cooperate with the magnet 54 to generate a securing signal. The controller 31 is configured to receive the securing signal.

The kitchen device 10 further includes a motor 58 arranged below the vessel assembly 14. The motor 58 has a shaft (not shown) that engages the blade assembly 38, which also projects outwardly from the vessel 16, to rotate the blade assembly 38 about an axis 60 to process the ingredients received in the space 36.

As shown in FIG. 3, the kitchen device 10 also includes a heating element 70 mounted below the bottom wall 32 of the vessel 16 to heat the vessel 16 for cooking the ingredients to be received in the vessel 16.

Use of the kitchen device 10 will now be discussed.

Figure 5:
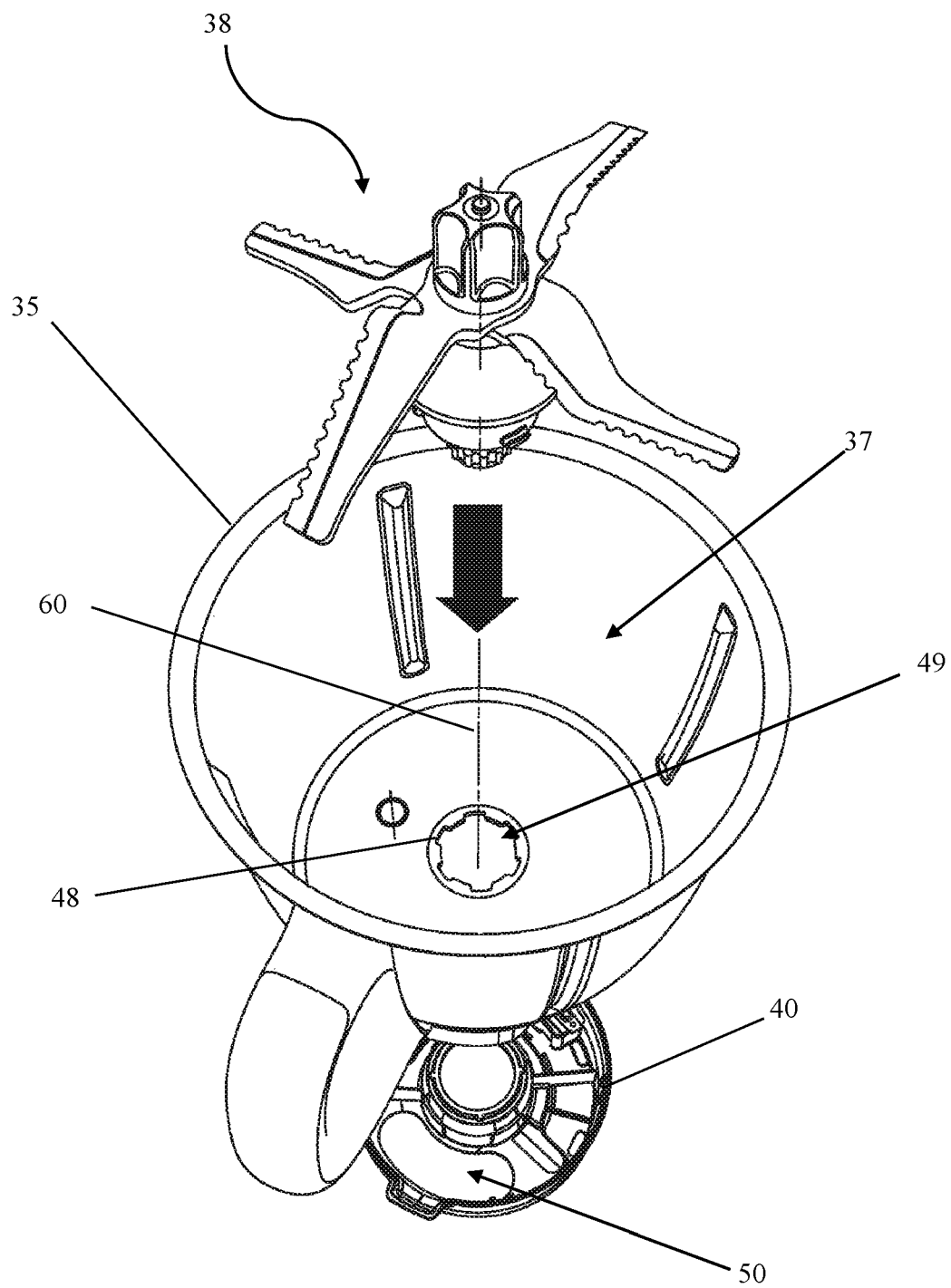
FIG. 5 is an exploded top perspective view of a vessel assembly of the kitchen device of FIG. 1.
Figure 7:
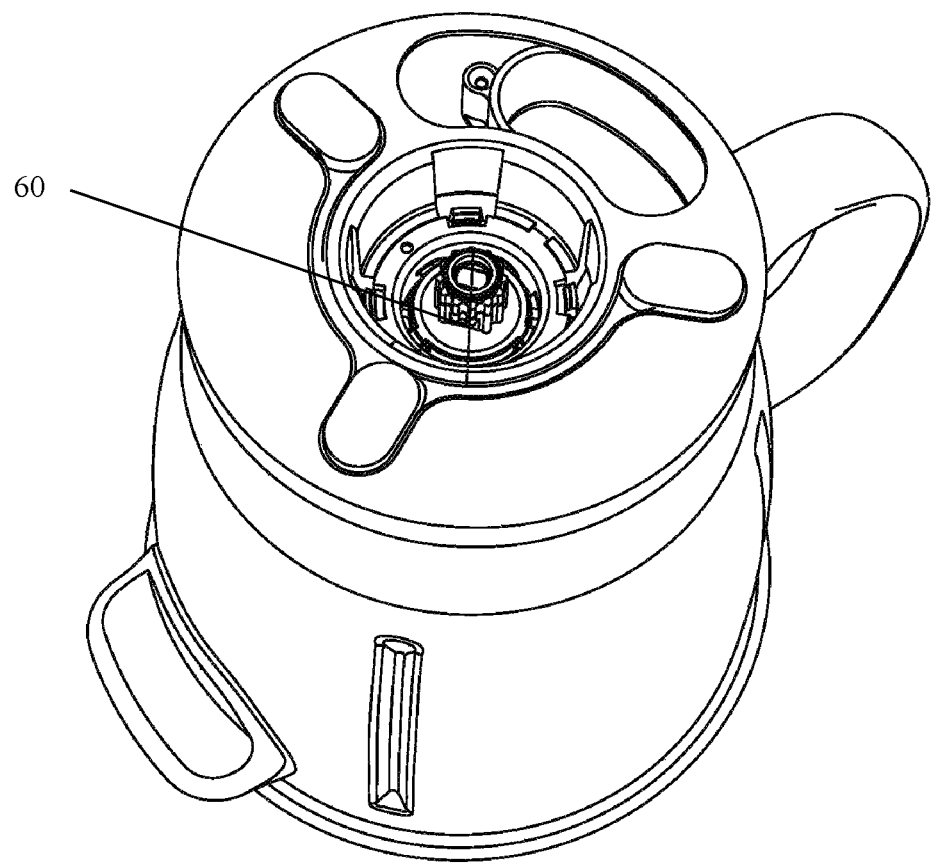
FIG. 7 is a bottom perspective view of the vessel assembly of FIG. 4.
Figure 8:
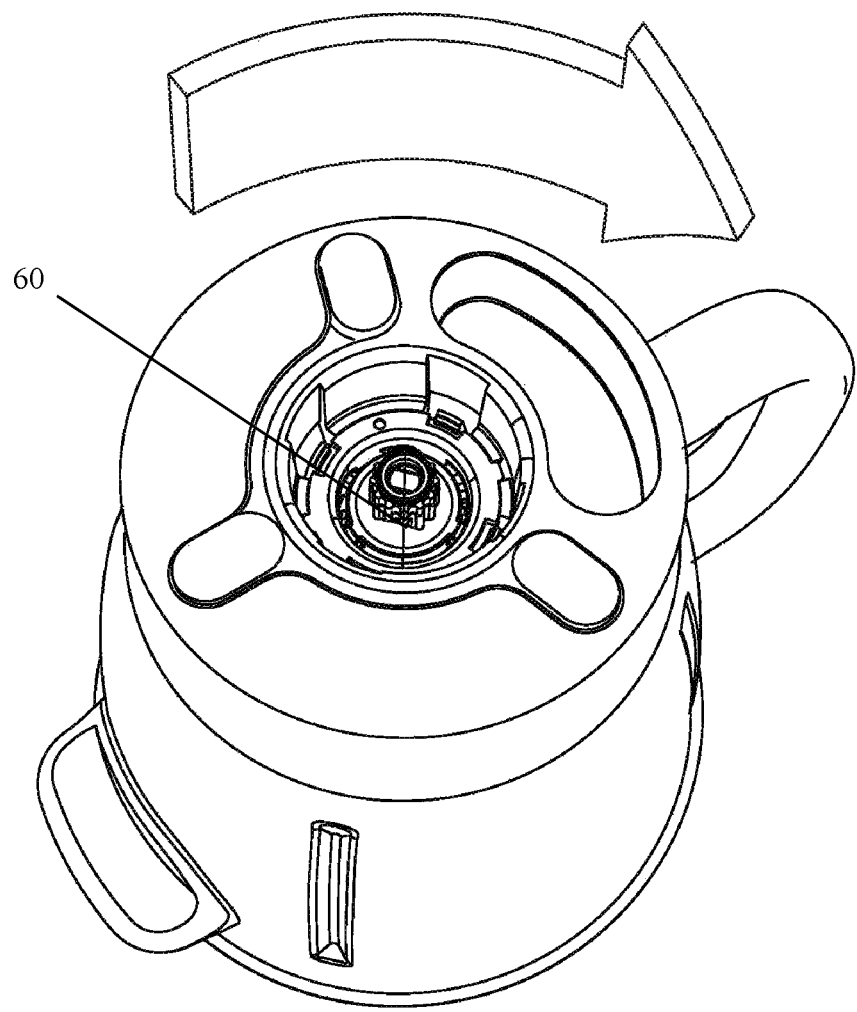
FIG. 8 is a bottom perspective view of the vessel assembly of FIG. 4 in a second configuration.

To use the kitchen device 10, the vessel assembly 14 must be assembled. Referring to FIG. 5, the blade assembly 38 is placed into the aperture 49 such that the protrusions 46 engage the recesses 48. A lower portion of the blade assembly 38 thus projects beyond the bottom wall 32. Referring to FIG. 6, the collar 40 is moved from position towards the bottom wall 32 of the vessel 16, such that the tabs 42, 44 engage each other, as shown in FIG. 7. Any of these positions of the collar 40 can be considered a release position, as the blade assembly 38 may be moved relative to the vessel 16. The collar 40 is then pivoted about the axis 60 relative to the vessel 16, as shown in FIG. 8, until the aperture 50 aligns with the protrusion 52. The angular shape of the slanted tabs 42 urges the tabs 44, and thereby the blade assembly 38, downward, i.e. away from the opening 37. The blade assembly 38 is thus constrained from movement relative to the bottom wall 32. The collar 40 is now in a securing position fixing the blade assembly 38.

The vessel assembly 14 is now mounted on the base 12. The aperture 50 and protrusion 52 both align with a receptacle 62 housing a plurality of connectors (not shown) to locate the vessel assembly 14 in a predetermined position on the base 12, shown in FIG. 3. When the collar 40 is in the securing position, and the vessel assembly 14 is in the predetermined position, the magnet 54 and the hall sensor 56 are aligned such that the hall sensor 56 produces the securing signal indicating that the collar 40 is in the securing position.

Figure 9:
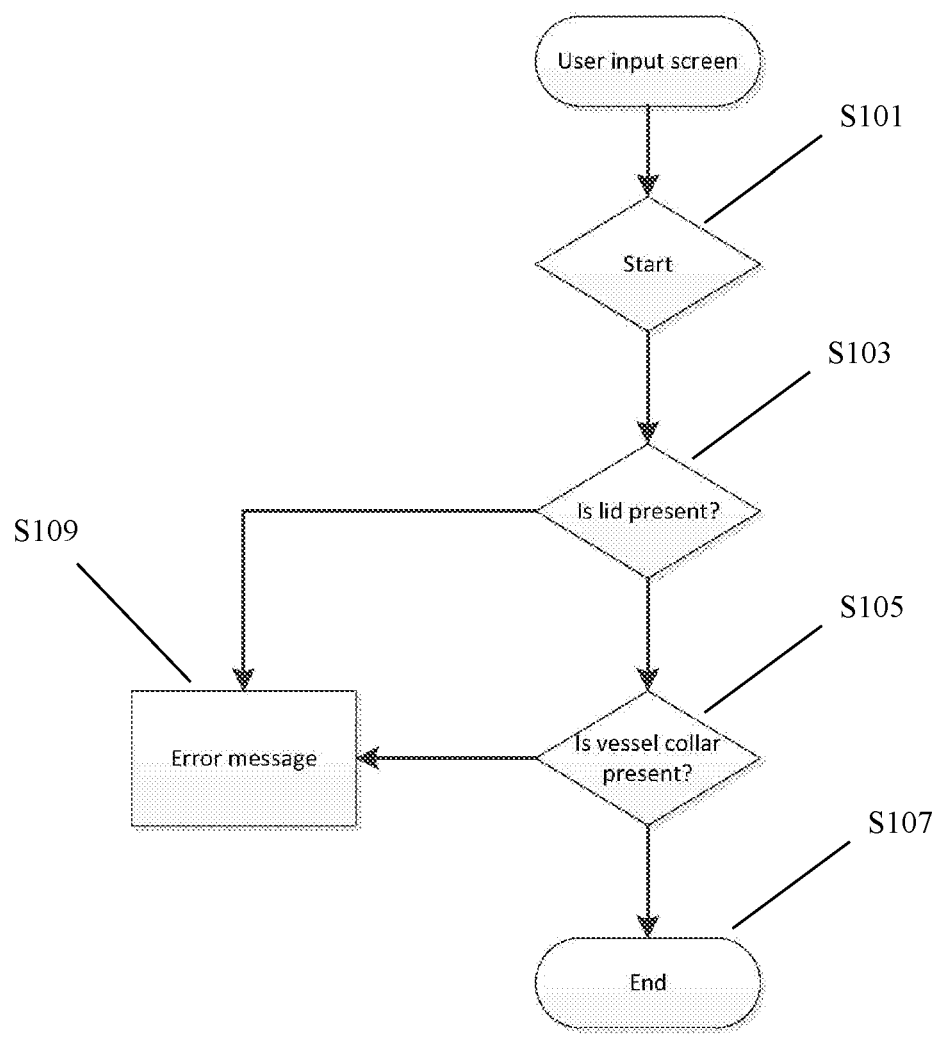
FIG. 9 is a schematic flow diagram of a method for operating the kitchen device of FIG. 1.

The locking arm 20 is now moved to secure the lid 18 against the vessel 16. The lid sensors 28 in the channels 26 are actuated by the protrusions 30 to generate the lid locking signal. A user may now, using the touchscreen 13*a*, buttons 13*b*, and dial 13*c* select an operating mode of the kitchen device 10. As shown in FIG. 9, when an operation is selected, at step S101, the controller 31 determines, at step S103, whether it has received a lid locking signal. The controller 31 then determines, at step S105, whether it has received a securing signal. If the controller 31 has received both the lid locking signal and the securing signal, at step S107, it proceeds to perform the requested operation, for example by controlling the motor 58 using a motor controller (not shown) to rotate the blade assembly 38 about the axis 60. If the controller 31 has not received either the lid locking signal and/or the securing signal, at step S109, an error message is displayed on the touchscreen 13*a*, and the motor 58 is not operated. Similarly, the heating element 70 can only be operated if the controller 31 received the lid locking signal and the securing signal.

Advantages of the kitchen device 10 will now be discussed.

The magnet 54 and hall sensor 56 enable a positive confirmation that the collar 40 is in the securing position and that the kitchen device 10 is safe to operate. This is a substantial safety improvement over previous devices, which were unable to perform this safety check.

Similarly, by ensuring that the motor 58 can only operate if a securing signal is received is a consumer-friendly fail-safe design.

The location of the blade assembly 38 in the vessel 16 by the reception of the protrusions 46 in the recesses 48 and the location of the vessel assembly 14 in the base 12 by the aperture 50, protrusion 52, and receptacle 62 ensure that in use, there may only be a single possible, predetermined position that the vessel 16, blade assembly 38, collar 40, and base 12 can have to each other. It will, however, be understood that as there are multiple protrusions 46 and recesses 48, the position of the blade assembly 38 may be rotated (i.e. radially oriented) to a number of other positions within the aperture 49 (e.g. six different radial positions in the depicted embodiments). This enables the use of a single magnet 54, as the location of the magnet 54 in relation to the hall sensor 56 is predetermined.

The invention claimed is:

1. A kitchen device, the kitchen device including:
    a base having a motor;
    a vessel assembly removably mounted on the base, the vessel assembly having:
        a vessel providing a space to receive ingredients to be processed;
        a blade assembly at least partly located in the space and drivable by the motor to process the ingredients, the blade assembly also projecting outwardly from the vessel to provide for driving engagement by the motor; and
        a collar to engage the blade assembly and secure the blade assembly to the vessel, the collar being movable relative to the vessel between a release position allowing removal of the blade assembly from the vessel and a securing position fixing the blade assembly to the vessel; and
    a locking arm to lock the lid against the vessel, the locking arm having a lid sensor to determine whether the lid is located on the vessel; and
    the kitchen device further including a sensor mechanism to detect, when the vessel assembly is mounted on the base, whether the collar is in the securing position,
    wherein the motor is only operable when the sensor mechanism detects that the collar is in the securing position or when the lid sensor detects that the lid is located on the vessel.

2. The kitchen device of claim 1, wherein the sensor mechanism includes:
    a first sensor portion located in the collar; and
    a second sensor portion located in the base, wherein the first sensor portion and second sensor portion cooperate to detect whether the collar is in the securing position.

3. The kitchen device of claim 1, wherein the kitchen device further has a controller configured to receive a securing signal from sensor mechanism, and the motor is controlled by the controller using a motor controller, wherein the controller prevents operation of the motor unless the securing signal is received.

4. The kitchen device of claim 1, wherein the collar has an aperture that cooperates with a protrusion located on the vessel to define a unique securing position.

5. The kitchen device of claim 4, wherein the protrusion on the vessel cooperates with a receptacle in the kitchen device to locate the vessel assembly in a predetermined position in the kitchen device.

6. The kitchen device of claim 1, wherein the blade assembly has a plurality of protrusions to engage a plurality of recesses in the vessel such that the blade assembly is prevented from rotating relative to the vessel.

7. The kitchen device of claim 1, wherein the kitchen device further includes a heating element adapted to heat the vessel for cooking the ingredients to be received in the vessel.

8. A method of operating a kitchen device, the kitchen device having:
    a base having a motor;
    a locking arm;
    a vessel assembly, the vessel assembling including:
    a vessel providing a space to receive ingredients to be processed;
    a lid removably located on the vessel to seal the space;
    a blade assembly at least partly located in the space and drivable by the motor to process the ingredients, the blade assembly also projecting outwardly from the vessel to engage the motor; and
    a collar movable between a release position allowing removal of the blade assembly from the vessel and a securing position fixing the blade assembly to the vessel;
    a sensor mechanism to detect, when the vessel assembly is mounted on the base, whether the collar is in the securing position a locking arm to lock the lid against the vessel, the locking arm having a lid sensor to determine whether the lid is located on the vessel; and
    a controller to:
        control the motor using a motor controller;
        receive a lid locking signal from the lid sensor indicating that the lid is located on the vessel; and
        receive a securing signal from a first sensor portion and/or a second sensor portion indicating that the collar is in the securing position,
    the method comprising the steps of:
        the controller determining whether it has received the lid locking signal;
        the controller determining whether it has received the securing signal; and
        the controller outputting an error message if it has not received the lid locking signal or the securing signal.

* * * * *